M. O. LUNDIN.
LIQUID LEVEL INDICATOR.
APPLICATION FILED AUG. 23, 1921.
1,425,116.
Patented Aug. 8, 1922.
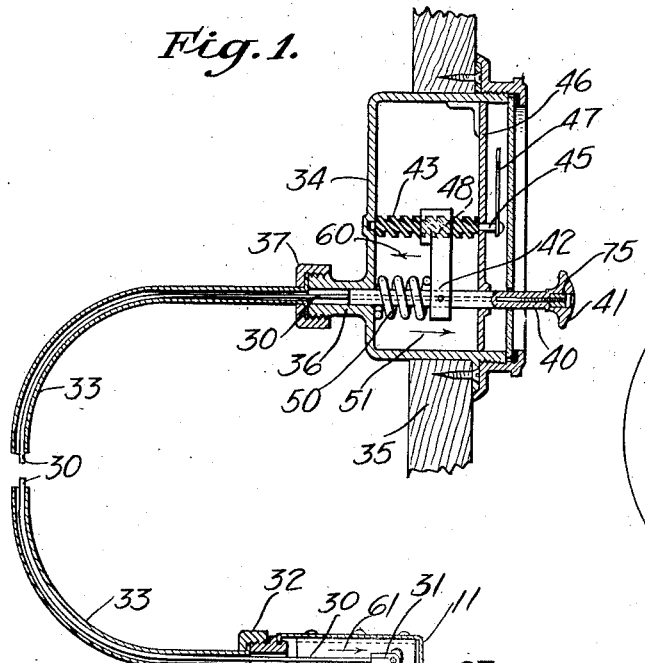
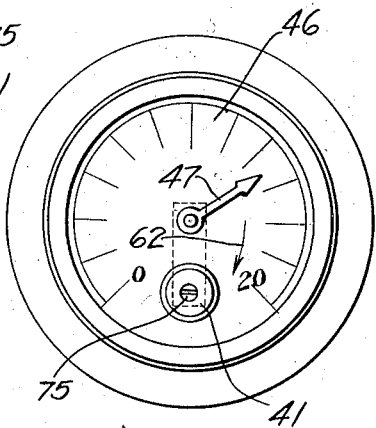
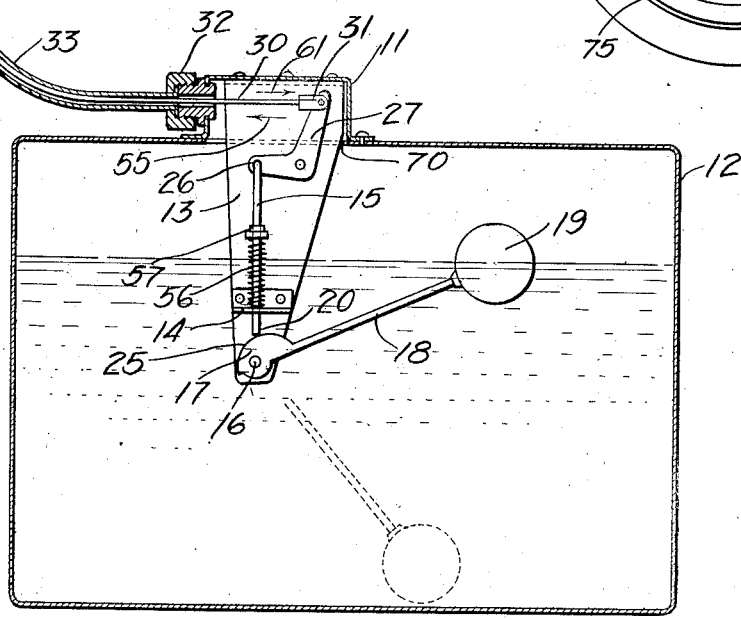
INVENTOR:
MATTIAS O. LUNDIN,
BY
ATTORNEYS.

UNITED STATES PATENT OFFICE.

MATTIAS O. LUNDIN, OF LOS ANGELES, CALIFORNIA.

LIQUID-LEVEL INDICATOR.

1,425,116.  Specification of Letters Patent.  Patented Aug. 8, 1922.

Application filed August 23, 1921. Serial No. 494,503.

*To all whom it may concern:*

Be it known that I, MATTIAS O. LUNDIN, a citizen of the United States, residing at Los Angeles, in the county of Los Angeles and State of California, have invented a new and useful Liquid-Level Indicator, of which the following is a specification.

This invention relates to apparatus for indicating the amount of liquid in a container by reference to the level of such a liquid in the container, and is particularly adapted to use as a gauge for indicating the amount of gasoline carried in the gasoline tank of an automobile.

There are upon the market at the present time, several gauges adapted to this use which transfer the movement of certain float mechanism to a suitable dial indicator by a steel wire contained within a flexible tube. In the installation of these gauges, it is generally necessary to make a number of bends in the flexible tubing and the wire contained within, especially in such cases where the gasoline tank is mounted at the rear of the machine and it is desired to place the indicator upon the instrument board. The friction of the wire within the tubing necessitates considerable force being used to cause the movement of the wire, and as in most types of these gauges the actuating force is furnished by the float it is, therefore, necessary to make the float of considerable size in order to overcome the frictional resistance of the wire within the tube. The use of these devices has never been widely adopted owing to the tendency of the actuating wire to bind at times within the protective tubing, thus making the reliability of the device not entirely dependable.

It is an an object of this invention to provide a level indicator in which the actuating element is entirely independent of the float and has the utility of bringing the transferring wire and its associated parts into a position relative to the position of a cam which is actuated by the float.

It is a further object of this invention to provide in such a device an arrangement whereby the transfer of the movement of the level indicating elements to the registering means is accomplished entirely with a condition of tension in the transferring wire, thus maintaining the wire in its shortest position within the tubing and thereby eliminating the possibility of error at the indicator arising from the buckling of the wire within the tubing as occurs in such devices wherein the transferring wire functions in compression.

It is also a further object of this invention to provide a float mechanism which may be quickly placed in any container and which does not require a special construction of the container for its accommodation.

It is a still further object of this invention to provide a device of this nature which may be very cheaply manufactured owing to its extreme simplicity of construction.

Other objects and advantages will be made evident hereinafter.

Referring to the drawing which is for illustrative purposes only:

Fig. 1 is a sectional view illustrating one of the applications to which my device is adapted.

Fig. 2 is a face view of the indicator dial shown in Fig. 1.

In the embodiment of my invention shown in the drawing, 11 is a formed metal cap adapted to be mounted upon a container 12. Downwardly from the interior of the cap 11 is projected a plate 13 having mounted thereupon an angle clip 14 through which extends a cam follower 15. Upon a pin 16 is pivoted a cam 17 from which extends a float arm 18 carrying upon its free end a suitable float 19. The lower end 20 of the rod 15 rests upon the cam 17 and is raised or lowered according to the position of the cam. The contour 25 of the cam 17 is of such formation that the movement of the rod 15 will be in relation to the liquid contents of the container. This relation would be in direct proportion to the level of the liquid in the container where the device is used upon a tank of rectangular cross-section but in most cases it will be found that the tanks upon automobiles are either circular or elliptical in cross-section; therefore, the rise of the float would not be in direct proportion to the quantity of liquid contained therein, and to provide a direct reading of the amount of liquid contained in the tank the contour of the cam is formed to suit the existing condition.

The rod 15 is pivoted at 26 to the bell crank 27, which is also mounted upon the plate 13, the rotative movement of the bell crank 27 being used to actuate a wire 30 which is attached thereto as shown at 31. The wire 30 passes through a suitable tubing connection 32 and is carried through a length of flexible tubing 33 to a frame cup 34 adapted to be mounted upon the instrument board 35 of an automobile. Extending through a projection 36 of the frame cup 34, which projection is provided with a tubing connecting means 37; the wire 30 is attached to the shaft 40 upon which is mounted a knob 41 and a block 42. A shaft 43 having helical threads formed thereupon is centrally supported within the frame cup 34, and upon the end 45 thereof which extends through a dial 46 is mounted an indicator 47. The block 42 is internally threaded at 48 to correspond to the shaft 43 so that a lateral movement of the block 42 will cause a rotation of the shaft 43 as the block moves therealong. A spring 50 placed around the shaft 40 operates against the block 42 and forces the same in an outward direction as indicated by the arrow 51. The direction of the spring against the block 42 exerts a pull or tension upon the wire 30 and has the action of drawing the wire 30 through the tubing 33. This pull is transferred by the wire 30 and is exerted upon the bell crank 27 in the direction of the arrow 55 and forces the follower rod 15 downwardly against the cam 17 as illustrated.

A spring 56 surrounds the rod 15 and exerts its force between a collar 57 and the clip 14. This spring 56 is of just sufficient strength to overcome the friction between the wire 30 and the interior of the tubing 33, causing a pull in the wire 30 in a direction opposite to that by the spring 50.

The particularly valuable feature of my invention of eliminating the liability of error due to the binding of the frictionally engaging parts is accomplished in a manner which will be made evident in the following description of the operation of my device. When the operator desires to ascertain the quantity of gasoline in the tank 2, the knob 41 is forced inwardly against the action of the spring 50 which causes the movement of the block 42 along the shaft 43 as indicated by the arrow 60. This movement of the block 42 is also transferred to the wire 30 through the rod 40, and the action of the spring 56 in overcoming the frictional resistance of wire 30 and its enclosing tube, draws the wire back in the direction of the arrow 61 and lifts the rod 15 to its highest position. It will also be perceived that the indicator 47 will then be rotated in the direction of the arrow 62 to its most advanced position. When the knob 40 is released, the spring 50 forces the block outwardly as indicated by the arrow 51 and the rod 15 is forced downwardly until its lower end 20 comes into contact with the contour 25 of the cam 17. It will be seen, therefore, that the position of the cam as governed by the position of the float 19 will determine the extent to which the block 48 may be forced outwardly, and as the position of the indicator 47 is dependent entirely upon the lateral position of the block, it will be returned to a position which will indicate the amount of gasoline contained within the tank 2. I provide a means of adjustment between the float mechanism and the indicator in the form of a sleeve nut 75 contained in a recess in the knob 41 and threaded upon the wire 30 so that the effective length thereof may be increased or shortened as conditions may require.

The freeing of the float from all actuating effort makes it possible to use a float of very small size, which further makes it possible for the level indicating device to be placed within any tank through a reasonably small hole 70 cut therein to correspond to the size of the cap 1. The manual operation of the knob 41 breaks any binding that might be existent between the wire 30 and the tubing 33 and thus overcomes the difficulty heretofore arising from this source. The feature of employing the wire 30 entirely in tension eliminates a source of error in the transferring of the movement of the level indicating elements to the indicating means and insures an accurate reading of the contents of the container to which it is applied.

I claim as my invention:

1. In a liquid level indicator of the class described, the combination of: a float actuated cam; a cam follower to cooperate with said cam; means for maintaining said follower in a position against said cam; an indicating device; and link mechanism to transmit the movement of said cam follower to said indicating device.

2. In a liquid level indicator of the class described, the combination of: a float actuated cam; a cam follower to cooperate with said cam; means for bringing said follower in a position against said cam; an indicating device; and link mechanism to transmit the movement of said cam follower to said indicating device.

3. In a liquid level indicator of the class described, the combination of: a float actuated cam; a cam follower to cooperate with said cam; means for maintaining said follower in a position against said cam; an indicating device; link mechanism to transmit the movement of said cam follower to said indicating device; and means to manually operate said link mechanism in a direction that will remove said cam follower from said cam.

4. In a liquid level indicator of the class described, the combination of: a float actuated cam; a cam follower operable to be brought against said cam; mechanism associated with said cam follower which may be operated to move said follower against or away from said cam; an indicating device so connected with said mechanism that the indicator thereof will be caused to assume a position relative to the position of said cam follower; and means for actuating said mechanism to advance or retreat the position of said cam follower.

5. In a liquid level indicating device of the class described, the combination of: a float actuated cam; a cam follower operable to be brought against said cam; an indicating device; a link connected to said indicating device; mechanism so connected between said link and said cam follower that the pull of said link will move said follower in a direction to bring same against said cam; and means for exerting a pulling force upon said link.

6. In a liquid level indicating device of the class described, the combination of: a float actuated cam; a cam follower operable to be brought against said cam; an indicating device; a link connected to said indicating device; mechanism so connected between said link and said cam follower that the pull of said link will move said follower in a direction to bring same against said cam; means for exerting a pulling force upon said link; and manually operated means to exert a compressive force upon said link and thereby cause said follower to be lifted from said cam.

7. In a liquid level indicating device of the class described, the combination of: a float actuated cam; a cam follower operable to be brought against said cam; an indicating device; a link connected to said indicating device; mechanism so connected between said link and said cam follower that the pull of said link will move said follower in a direction to bring same against said cam; and spring means for exerting a pulling force upon said link.

8. In a liquid level indicating device of the class described, the combination of: a float actuated cam; a cam follower operable to be brought against said cam; an indicating device; a link connected to said indicating device; mechanism so connected between said link and said cam follower that the pull of said link will move said follower in a direction to bring same against said cam; spring means for exerting a pulling force upon said link; and manually operated means to exert a compressive force upon said link and thereby cause said follower to be lifted from said cam.

9. In a liquid level indicating device of the class described, the combination of: a float actuated cam; a cam follower operable to be brought against said cam; an indicating device; a link connected to said indicating device; mechanism so connected between said link and said cam follower that the pull of said link will move said follower in a direction to bring same against said cam; means for exerting a pulling force upon said link; manually operated means to exert a compressive force upon said link and thereby cause said follower to be lifted from said cam; and means acting to exert a pulling force upon the end of said link connected to said mechanism to assist in moving said link in the direction to cause the lifting of said follower.

10. In a liquid level indicating device of the class described, the combination of: a float actuated cam; a cam follower operable to be brought against said cam; an indicating device; a link connected to said indicating device; mechanism so connected between said link and said cam follower that the pull of said link will move said follower in a direction to bring same against said cam; means for exerting a pulling force upon said link; manually operated means to exert a compressive force upon said link and thereby cause said follower to be lifted from said cam; and spring means acting to exert a pulling force upon the end of said link connected to said mechanism to assist in moving said link in the direction to cause the lifting of said follower.

In testimony whereof, I have hereunto set my hand at Los Angeles, California, this 17th day of August, 1921.

MATTIAS O. LUNDIN.